United States Patent [19]

Zeller et al.

[11] Patent Number: 4,478,669

[45] Date of Patent: Oct. 23, 1984

[54] ADHESIVE BONDED GUN ASSEMBLY FOR APPLYING FASTENER

[75] Inventors: Albert M. Zeller, Sauk Village; Edward W. Janes, Frankfort, both of Ill.

[73] Assignee: Illinois Tool Works Inc., Chicago, Ill.

[21] Appl. No.: 584,058

[22] Filed: Feb. 27, 1984

[51] Int. Cl.³ .................... B23K 13/00; H01F 15/06
[52] U.S. Cl. .......................... 156/379.7; 156/379.8; 156/497; 156/579; 219/10.51; 219/10.53; 219/10.79
[58] Field of Search ............... 156/379.7, 379.8, 583.1, 156/497, 272.4, 579; 219/10.51, 10.53, 10.75, 10.79

[56] References Cited

U.S. PATENT DOCUMENTS

| | | | |
|---|---|---|---|
| 4,017,701 | 4/1977 | Mittelmann | 219/10.79 |
| 4,120,712 | 10/1978 | Sindt | 219/10.53 |
| 4,128,449 | 12/1978 | Kobetsky | 156/379.7 |
| 4,139,408 | 2/1979 | Kobetsky | 156/379.7 |
| 4,163,884 | 8/1979 | Kobetsky | 156/379.7 |
| 4,355,222 | 10/1982 | Geithman et al. | 219/10.53 |

Primary Examiner—Michael Wityshyn
Attorney, Agent, or Firm—Thomas W. Buckman; John P. O'Brien

[57] ABSTRACT

A gun assembly for bonding a fastener to a workpiece is disclosed which uses heat induction to fuse a thermoplastic adhesive coating on the base of the fastener to the workpiece. The gun assembly has a head member of electrically non-conducting material. A hollowed core electrical conductor is embedded in the head member in a spiral configuration adjacent the surface of the forward end of the head member. Seating means are provided on the forward end centrally of the spiral configuration for receiving the fastener to be applied to the workpiece. An air conduit extending through the head member between its forward and rearward ends is in communication with the seating means. A flux concentrator plate is mounted on the forward end of the head member and surrounds the seating means. A body member slidingly supports the head member and is selectively moved between a retract position and a workpiece engaging position by a piston and cylinder drive means.

11 Claims, 5 Drawing Figures

Fig. 1b →

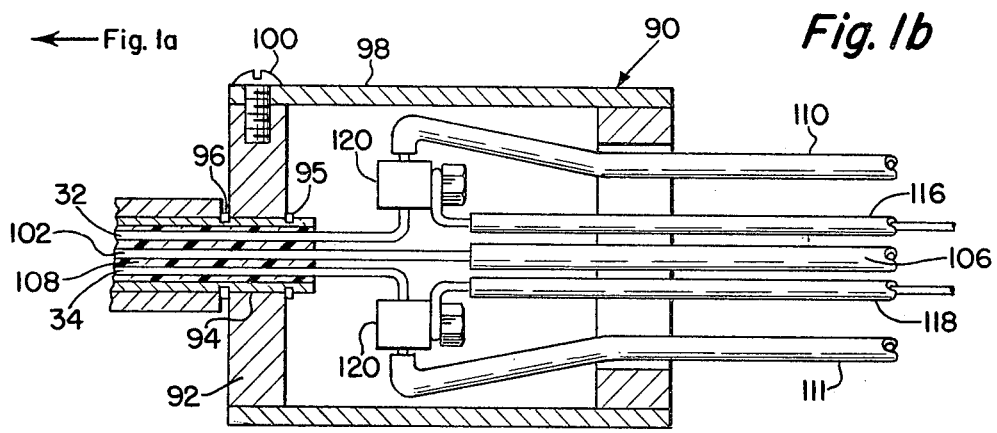
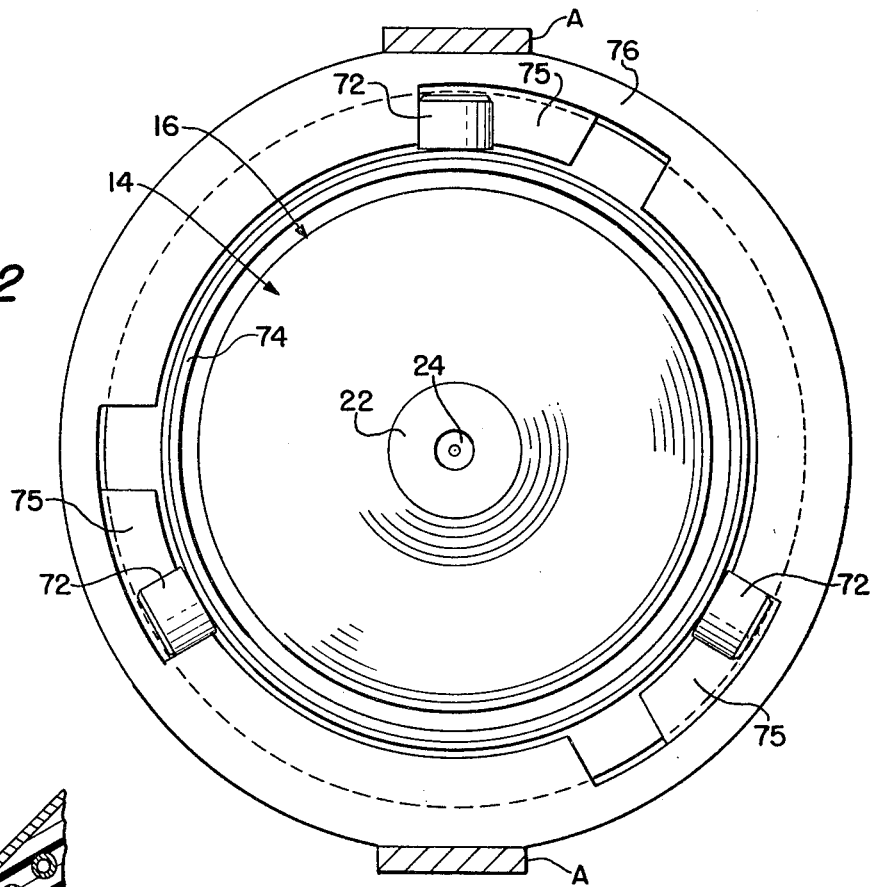
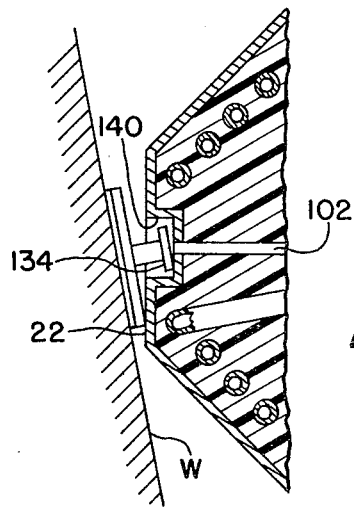

ADHESIVE BONDED GUN ASSEMBLY FOR APPLYING FASTENER

BACKGROUND OF THE INVENTION

This invention relates to a gun assembly for applying an adhesive bonded fastener and in particular to a gun assembly which uses heat induction to fuse the thermoplastic adhesive backed fastener to a workpiece.

There have been many efforts to produce a suitable trim attachment system for automobiles and appliances without using holes in the workpiece. One successful application has been the use of a fastener having a coating of thermoplastic adhesive which can be bonded to the finish of the workpiece by means of induction heating. Induction heating fixtures for applying adhesive-backed fasteners are described in U.S. Pat. Nos. 4,128,449; 4,139,408; and 4,163,884.

This invention is directed to a gun assembly that is designed to adhesively bond a fastener to a workpiece in a rapid, reliable and economical manner.

SUMMARY OF THE INVENTION

This invention is directed to a gun assembly for bonding a fastener to a workpiece by using heat induction to fuse a thermoplastic adhesive coating applied to the base of the fastener. The gun assembly is constructed of a body member and a head member which is slidable on the body member between a retract position and a workpiece engaging position. The head member is slidable on the body member by means of an elongated shaft attached from its rearward end. An electrical conductor is wound into several turns at the forward end of the head member which cooperates with a flux concentrator plate mounted on the forward end to produce a magnetic field of flux of sufficient intensity to fuse a thermoplastic adhesive coating applied to the base of a fastener. The fastener is held in a seating means located on the forward end of the head member centrally of the concentrator plate. A drive means is provided for selectively moving the head member to the workpiece engaging position.

DESCRIPTION OF THE DRAWINGS

For a better understanding of this invention, reference may be made to the accompanying drawings, in which:

FIG. 1b is a partial cross-sectional view showing the right-hand side of a hand gun assembly embodying the principles of this invention;

FIG. 2 is an end view taken from the left-hand side of FIG. 1a showing the installation of the gun assembly in a workpiece locating apparatus;

FIG. 3 is a partial cross-sectional view of the head member for the gun assembly of this invention illustrating the seating means for retaining the fastener in place as it is being fused to a workpiece.

DESCRIPTION OF PREFERRED EMBODIMENT

Figure 1A:
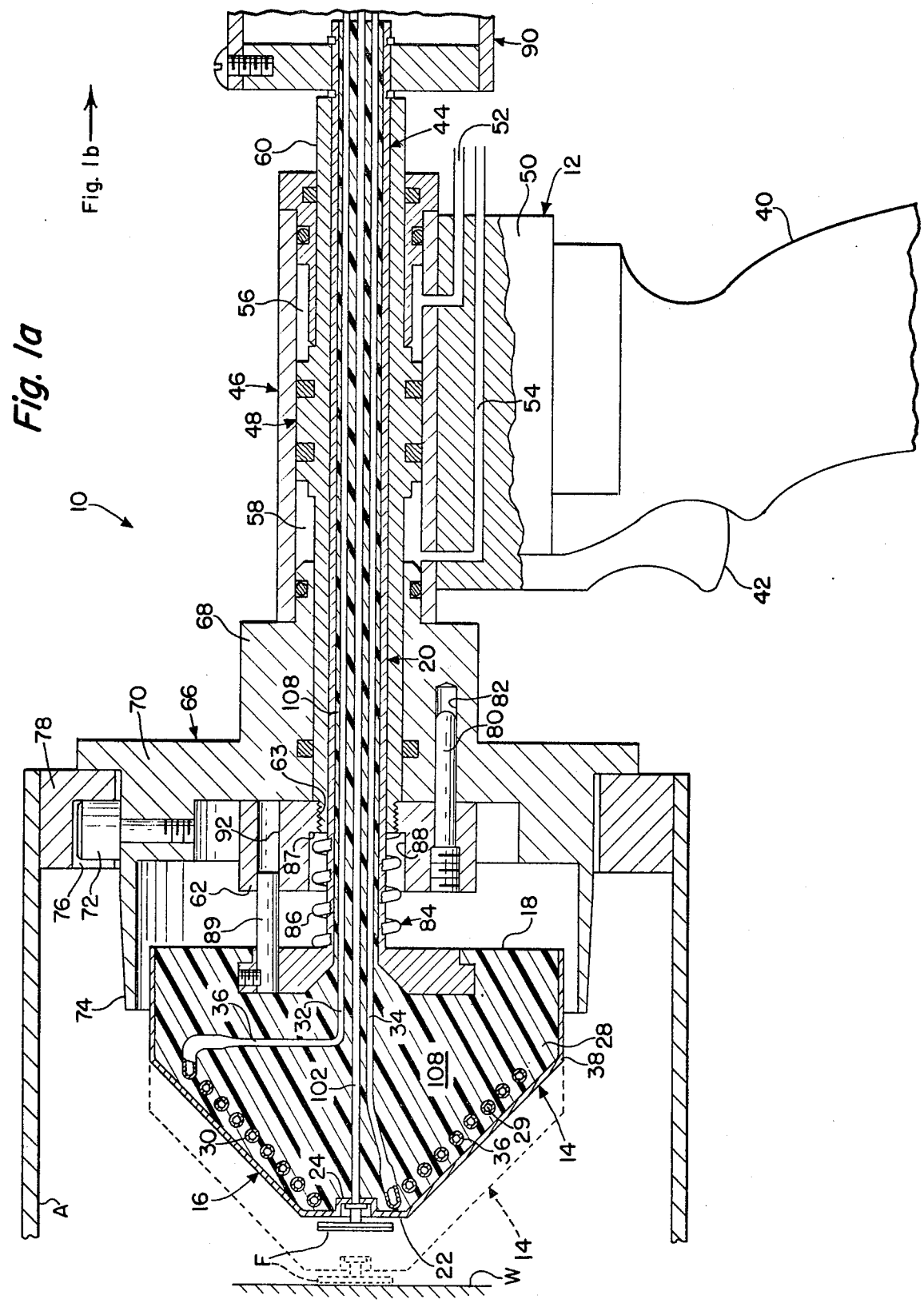
FIG. 1a is a partial cross-sectional view showing the left-hand side of a gun assembly incorporating the principles of this invention.

Referring to FIGS. 1a and 1b, there is illustrated a gun assembly embodying the principles of this invention and generally designated by the reference numeral 10. Gun assembly 10 is constructed with a body member 12 and a head member 14.

The head member 14 has a forward end portion 16 and a rearward end portion 18. The head member 14 is slidingly mounted relative to the body member 12 by virtue of a shaft member 20 which is attached in a normal relation at the center of the rearward end portion 18.

The forward end portion 16 of head member 14 has a truncated conical shape. There is provided centrally in the flattened end section 22 of the truncated forward end 16, a seating means 24 for receiving the fastener to be applied to the workpiece.

The head member 14 is molded of a non-electrical conducting material 28, such as an epoxy resin. Embedded in the molded material 28 is an electrical conductor 30. The electrical conductor 30 has a spiral configuration embedded in the epoxy material adjacent to the forward end 16 with two terminal leads 32 and 34 that extend from the opposite ends of the spiral configuration, through the head member 14 and through the shaft member 20. For purposes of cooling the electrical conductor 30 is made of a hollowed core copper conductor wire 36.

The head member 14 is enveloped by a flux concentrator plate 38 except for its rearward end portion 18. The purpose of the flux concentrator plate 38 is to focus the magnetic flux field generated by the heat induction generator towards the seating means 24. When a metal fastener is located in the seating means 34, the flux density created in the metal fastener produces heat by the hysteresis and eddy current effect to activate the adhesive coating which is applied to the base of the metal fastener.

The body member 12 is constructed with a handle portion 40 for facilitating the use of the gun assembly 10. The handle portion 40 has a built-in trigger 42 which can be actuated by the operator's finger to initiate the process of bonding a fastener to the workpiece.

The body member 12 carries a drive means 44 for displacing the head member 14 and associated shaft member 20 between the retract position (shown by the solid line of head member 14 in FIG. 1a) and the work engaging position (shown by the dotted line of head member 14 in FIG. 1a).

The drive means 44 comprises an air cylinder 46 and piston member 48. Extending through the base plate 50 of the body member 12 and through the cylinder wall 46 are a pair of air pressure lines 52 and 54, respectively, which are in communication with retract and forward air chambers 56 and 58, respectively. Chambers 56 and 58 are formed between the piston shaft 60 and the air cylinder 46.

Mounted on the forward end of the piston shaft 60 is a piston end cap 62 which is circular in configuration. Piston end cap 62 has a threaded aperture 63 which is screwed on the end of the threaded end of piston shaft 60.

For accurate placement and adhesion of the metal fastener F relative to the workpiece W, gun assembly 10 has a fixture locating collar 66 which locks into a workpiece locating apparatus A. The fixture locating collar 66 has a reduced diameter neck portion 68 secured to the air cylinder 46 and an annular flange 70.

Three equally spaced cam follower members 72 (one shown in FIG. 1a) are mounted at equally spaced points on the cylindrical surface 74 of annular flange 70, and cooperate with complementary cam follower grooves 75 formed in the radially inwardly directed flange 76 of fixture apparatus A. As illustrated in FIG. 2 the cam followers 72 rotate through a short arcuate segment (length of groove 75) to lock the entire gun assembly 10 into the fixture apparatus A.

To prevent the rotation of the piston shaft 60 relative to the workpiece locating apparatus A, a pin 80 extends rearwardly from the piston end cap 62 into a circular bore 82 formed inwardly of annular flange 70. The pin 80 is free to slide in the bore 82 as the piston shaft 60 moves between the workpiece engaging position and the retract position.

To provide a constant holding force on the fastener F during the bonding operation a spring bias means 84 is provided between the piston end cap 62 and the rear end 18 of head member 16. This spring bias means 84 comprises a spring 86 disposed about the shaft member 20 and sandwiched between the end wall 18 of head member 16 and the inner end 86 of counterbore 88 in the piston end cap 62.

The head member 16 is prevented from rotating relative to the piston member 48 by virtue of a pin 89 which rides in a circular bore 92 formed in the piston end cap 62 as shown in FIG. 1a. The pin 89 is free to slide in the bore 92 as the head member 14 moves relative to the piston shaft 60 during the compression of spring 86.

There is mounted on the rear end of shaft member 20 a terminal housing 90 (FIG. 1b). Terminal housing 90 is suspended from the rear end of shaft member 20 by virtue of its front wall 92. Front wall 92 has an aperture 94 through which the shaft member 20 extends. The shaft member is fastened to the front wall 92 by virtue of a pair of snap rings 95, 96 which fasten onto the shaft member on either side of the front wall 92.

The purpose of terminal housing 90 is to provide a junction box for both the electrical connectors and the pneumatic connectors of assembly gun 10. The terminal housing 90 is an enclosed structure having a top plate 98 with several fasteners 100 that fasten the top plate to the side walls to permit entry through the top wall.

The conductor leads 32 and 34 of electrical conductor 30 extend from the head member 14 through the entire length of the shaft member 20 and into the terminal housing 90.

Extending between the seating means 24 and the terminal housing 90 is an air conduit 102 that is disposed through the center portion of the shaft member 20. The air conduit 102 terminates in communication with the seating means 24 at one end and at the other end connects to an air line 106.

The air conduit 102 and the electrical leads 32 and 34 are held in the spaced apart relationship shown in FIGS. 1a and 1b by an epoxy resin material 108.

A pair of air hoses 110 and 111 are fastened to the outer ends of hollow core conductor leads 32 and 34 for providing an air passageway therethrough.

The pair of conductor leads 32 and 34 are electrically connected to wires 116 and 118, respectively, by means of terminal connectors 120 and 122, respectively.

Figure 4:
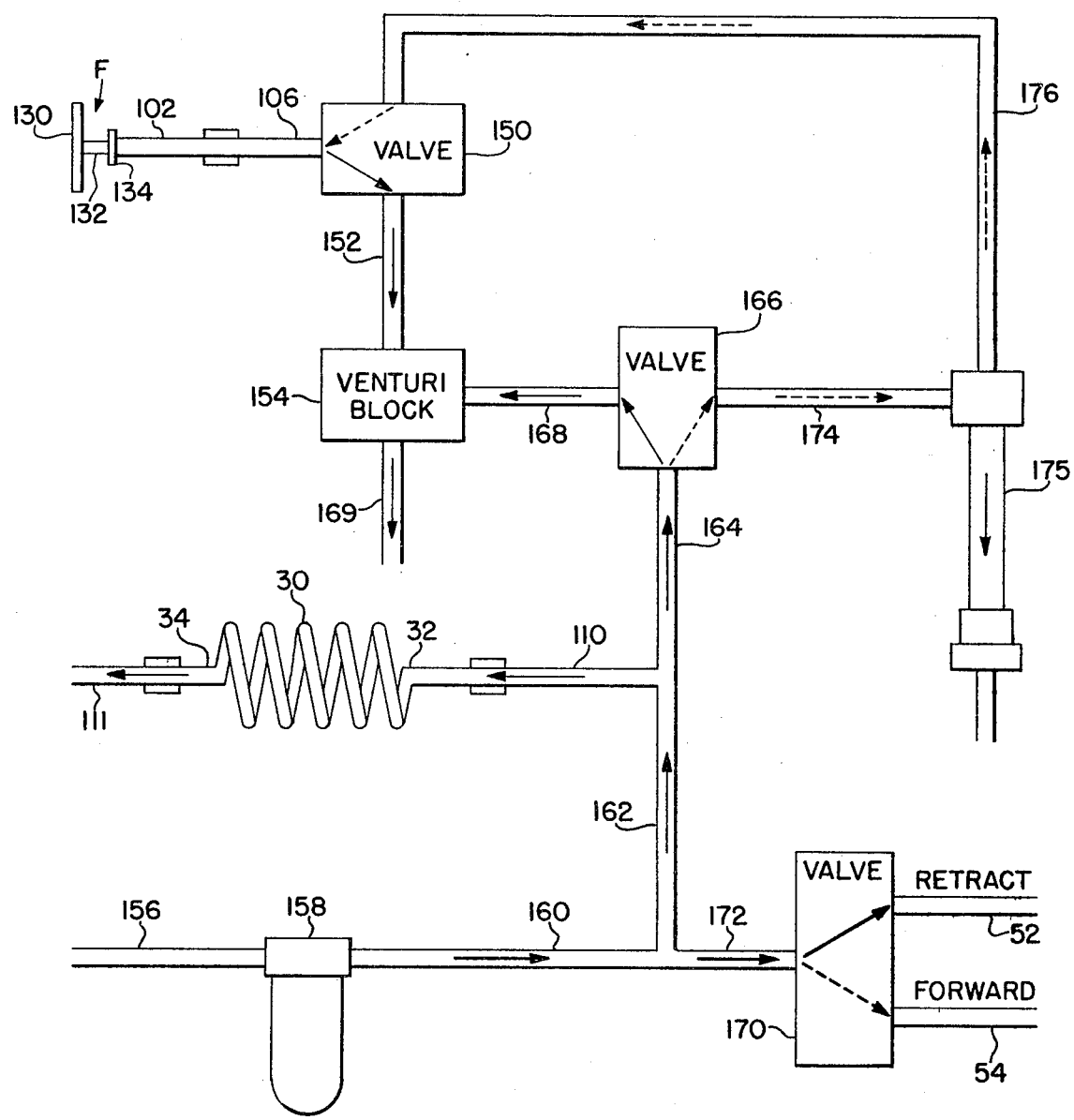
FIG. 4 is a diagrammatical view of the pneumatic circuitry for controlling the gun assembly of this invention.

The operation of the gun assembly illustrated in FIGS. 1a and 1b will now be described with reference to the pneumatic control circuitry illustrated in FIG. 4 that controls the operation of the gun assembly's components. The basic relay control operations of the valves illustrated in FIG. 4 are controlled by a programmable controller such as the MODICON MICRO 84 progrmmable controller which is manufactured and sold by Gould Inc. At the beginning of the heat bonding operation, valves 150, 166 and 170 are in the solid arrow positions depicted in FIG. 4.

The particular fastener F illustrated in the drawings is a conventional welding stud having a circular base member 130, a stem portion 132 and a small circular head portion 134. Each fastener F has a heat cured thermoset adhesive coating applied to the base 130.

As is described in U.S. Pat. No. 4,163,885 an induction heating generator is used to provide a magnetic flux field having a flux density of sufficient magnitude to produce a heat level in the metal fastener F high enough to activate the adhesive coating. There are several commercially available induction heat generators such as one sold by the Pillar Corporation. The induction heat generator used in conjunction with this application is controlled by a programmable controller such as the MODICON MICRO 84 controller.

Prior to initiating a heat bonding cycle by depressing trigger 42, a metal fastener F is placed in seat means 24. As depicted in FIG. 3 the seat means 24 is formed as a circular recess 140 having a diameter larger than the diameter of the head 134 of fastener F. The fastener is held in the circular recess 140 by a vacuum means comprising a suction force applied through air conduit 102 that communicates directly with the head 134 of fastener F.

Referring to FIG. 4 the suction force on fastener F is provided through line 102 through the three way valve 150 when the valve 150 is connected in the solid arrow position, and down through line 152 into Venturi block 154.

The air source for providing the vacuum in Venturi block 154 is provided from a compressed air source delivered into line 156 where it passes through filter 158 and through lines 160, 162, and 164, through three way valve 166 (when in the dotted arrow position), and through line 168 into Venturi block 154 and out exhaust line 169.

Whenever the gun assembly is waiting for the next cycle to commence, cooled air is shunted through the hollowed core electrical conductor 30 via line 110.

When the operator is ready to apply a fastener F to the workpiece W, he places a fastener F in the circular recess 140, which is held in place by the suction force applied through air conduit 102. He then manuevers the gun assembly to place the fixture locking collar 66 into the workpiece locating aperture A. Once the cam follower members 72 are brought into alignment with the cam follower groove 75, a slight anti-clockwise rotation on handle 40 locks the gun assembly 10 into a fixed mounting position relative to the workpiece W.

With the gun assembly in a locked position, the trigger 42 on the gun assembly 10 is depressed to commence an automatic sequence of operations. The induction heat generator (not shown) is turned on. Four way valve 172 is actuated to move the piston 48 from the "retract" position to the "forward" position (as indicated by the dotted line in FIG. 4). Compressed air is fed from line 170 into four way valve 172 which is set in the dotted arrow connection of FIG. 4. The dotted arrow connection of four way valve 170 sends the compressed air into air pressure line 154 to move the piston shaft 60 in a forward direction towards the workpiece W. When the fastener F engages the workpiece W, the programmable controller activates valve 166 to move to the dotted arrow position, which shuts off the suction force on line 102. Displacement of valve 166 to the dotted arrow position also terminates the transmittal of cooling air through the hollow core of electrical conductor 30.

The programmable controller is set to command the induction heating generator to transmit current through conductor 30 approximately 0.2 seconds after the piston member 48 is driven to the workpiece engaging position (dotted line in FIG. 1).

As illustrated in FIG. 3 the enlarged seating means 24 for the fastener F permits the fastener tool head 14 to work in conjunction with a workpiece W surface that is at a slight incline relative to the flattened end portion 22 of the truncated conical front end portion 16. The magnetic field of flux generated by the current flowing through the electrical conductor 30 and directed to the fastener F by the flux concentrator plate 38 actually provides a magnetic repelling force about the seating means 24 to drive the metal fastener F outwardly of the seating means.

In the workpiece engaging position the spring 85 is compressed to apply a constant bias force on the fastener F against the workpiece W.

The heating cycle for fusion of the thermosetting resin coating on the fastener F is approximately 4 seconds. During this 4 seconds the generator is pulsed on and off on a timed basis to prevent damaging the workpiece W surface, such as a painted metal surface.

At the end of the heating cycle, valve 150 is actuated to the dotted arrow position which sends cooled air through conduit 110 into electrical conductor 30 and through air conduit 102 via line 164, valve 166 (dotted arrow), line 174, vortex tube 175, line 176, valve 150 (dotted line), and into line 106. This cooling cycle permits the head 16 and the fastener F to be quickly cooled.

After the cooling period (approximately 2 seconds), the valve 170 is sequenced to move to the "retract" position (solid arrows) sending compressed air through line 52 into chamber 56 to thereby retract the piston member 48 to the "retract" position.

When the cylinder is returned to the "retract" position, three way valve 150 and 166 are both actuated to the solid arrow positions to terminate the cooling of conductor 30 and air conduit 102 and to re-apply a vacuum to air conduit 102.

While a specific embodiment of the invention has been disclosed, it will be understood that variations and modifications thereof may be effected without departing from the spirit and scope of the novel concepts disclosed and claimed herein.

We claim:

1. A gun assembly for bonding a fastener to a workpiece using heat induction to fuse a thermoplastic adhesive coating on the base of the fastener to the workpiece, comprising a head member to electrically nonconducting material which has a forward end and a rearward end, an electrical conductor mounted in said head member with a plurality of turns formed adjacent said forward end, means for selectively cooling said head member, seating means on said forward end for receiving the fastener to be applied to the workpiece, a flux concentrator plate mounted on said forward end of said head member and surrounding said seating means, a body member slidingly supporting said head means, and drive means for selectively moving said head member between a retract position and a workpiece engaging position.

2. A gun assembly as defined in claim 1, further comprises fixture means for locating said body member relative to the workpiece a fixed distance such that said head member contacts the workpiece when displaced to said workpiece engaging position.

3. A gun assembly as defined in claim 1, further comprising vacuum means for applying a suction force on a fastener when installed in said seating means.

4. A gun assembly as defined in claim 1, wherein said electrical conductor is formed with a hollow core and wherein said cooling means for said head member includes air pump means for passing cool air through said hollow core of said electrical conductor.

5. A gun assembly for bonding a fastener to a workpiece using heat induction to fuse a thermoplastic adhesive coating on the base of the fastener to the workpiece, comprising a head member of electrically nonconducting material which has a forward end and a rearward end, a hollowed core electrical conductor embedded in said head member, said conductor having two ends extending from said rearward end to said forward end and terminating in a spiral configuration adjacent the surface of said forward end, seating means on said forward end centrally of said spiral configuration for receiving the fastener to be applied to the workpiece, an air conduit extending through said head member between said forward end and said rearward end in communication with said seating means, a flux concentrator plate mounted on said forward end of said head member and surrounding said seating means, a body member slidingly supporting said head member, and drive means for selectively moving said head member between a retract position and a workpiece engaging position.

6. A gun assembly as defined in claim 5, wherein said forward end of said head member has a truncated conical shape, said seating means comprising a circular recess formed inwardly of said forward end and in direct communication with said air conduit, the diameter of said circular recess being larger than the diameter of the fastener's head portion to provide a loose fitting relationship therebetween, and further comprising vacuum means for applying a suction force through said air conduit on said fastener's head portion.

7. A gun assembly as defined in claim 5, wherein said body member includes a cylinder housing having a throughbore and a shaft means connected to said rearward end of said head member and slidingly supported in said throughbore.

8. A gun assembly as defined in claim 7, wherein said shaft means includes a hollow tubular carrier having one end connected to said rearward end of said head member, wherein a terminal housing is mounted on the other end of said hollow tubular carrier, and wherein said two ends of said electrical conductor and said air conduit extend from said rearward end of said head member, through said tubular carrier and into said terminal housing.

9. A gun assembly as defined in claim 8, wherein said shaft means includes a piston surrounding said tubular carrier in concentric relation therewith.

10. A gun assembly as defined in claim 9, further comprising spring bias means disposed between said piston and said rearward end of said head member for providing a constant spring bias on said head member.

11. A gun assembly as defined in claim 10, further comprising a fixture locating means attached to said body member for temporarily installing said gun assembly in a workpiece fixture in order to locate and hold said gun assembly in a preselected location relative to the workpiece.

* * * * *